(12) United States Patent
Weston et al.

(10) Patent No.: US 8,680,344 B2
(45) Date of Patent: Mar. 25, 2014

(54) MOLECULAR SIEVE ADSORBENT BLENDS AND USES THEREOF

(75) Inventors: Kerry C. Weston, Louisville, KY (US); Patrick Purcell, Louisville, KY (US)

(73) Assignee: Zeochem LLC, Louisville, KY (US)

(*) Notice: Subject to any disclaimer, the term of this patent is extended or adjusted under 35 U.S.C. 154(b) by 411 days.

(21) Appl. No.: 13/013,285

(22) Filed: Jan. 25, 2011

(65) Prior Publication Data

US 2012/0190900 A1     Jul. 26, 2012

(51) Int. Cl.
C07C 29/76   (2006.01)
C07C 7/12    (2006.01)
B01J 29/06   (2006.01)

(52) U.S. Cl.
USPC .................... 568/916; 585/823; 502/64

(58) Field of Classification Search
USPC .................... 568/916; 585/823; 502/64
See application file for complete search history.

(56) References Cited

U.S. PATENT DOCUMENTS

| | | | |
|---|---|---|---|
| 2,882,244 A | 4/1959 | Milton | |
| 2,973,327 A | 2/1961 | Mitchell et al. | |
| 3,049,449 A | 8/1962 | Allegrini | |
| 3,078,639 A | 2/1963 | Milton | |
| 3,130,021 A | 4/1964 | Milton | |
| 3,219,590 A | 11/1965 | Ribaud | |
| 3,702,886 A | 11/1972 | Argauer et al. | |
| 3,795,631 A | 3/1974 | Heinze et al. | |
| 3,843,741 A | 10/1974 | Yan | |
| 4,013,732 A | 3/1977 | Chang et al. | |
| 4,407,662 A | 10/1983 | Ginder | |
| 4,420,419 A | 12/1983 | Ogawa et al. | |
| 4,424,144 A | 1/1984 | Pryor et al. | |
| 4,487,614 A | 12/1984 | Yon | |
| 4,582,815 A | 4/1986 | Bowes | |
| 4,726,818 A | 2/1988 | Yeung et al. | |
| 4,762,537 A | 8/1988 | Fleming et al. | |
| 4,818,508 A | 4/1989 | Flank et al. | |
| 4,859,217 A | 8/1989 | Chao | |
| 5,001,098 A | 3/1991 | Pacaud et al. | |
| 5,053,374 A | 10/1991 | Absil et al. | |
| 5,120,693 A | 6/1992 | Connoly et al. | |
| 5,168,084 A | 12/1992 | Pellet et al. | |
| 5,173,462 A | 12/1992 | Plee | |
| 5,203,887 A | 4/1993 | Toussaint | |
| 5,292,360 A | 3/1994 | Pacaud et al. | |
| 5,316,656 A | 5/1994 | Pellet et al. | |
| 5,316,993 A | 5/1994 | Sextl et al. | |
| 5,413,978 A | 5/1995 | Kramer | |
| 5,468,700 A | 11/1995 | Ward | |
| 5,493,821 A | 2/1996 | Cohen et al. | |
| 5,531,808 A | 7/1996 | Ojo | |
| 5,552,035 A | 9/1996 | Potter et al. | |
| 5,665,325 A | 9/1997 | Verduijn | |
| 5,883,034 A | 3/1999 | Drake et al. | |
| 5,885,331 A | 3/1999 | Reiss et al. | |
| 5,948,726 A | 9/1999 | Moskovitz et al. | |
| 5,962,358 A | 10/1999 | Hees et al. | |
| 6,027,548 A | 2/2000 | Ackley et al. | |
| 6,077,984 A | 6/2000 | Drake et al. | |
| 6,106,593 A | 8/2000 | Golden | |
| 6,130,179 A | 10/2000 | Sampson et al. | |
| 6,183,539 B1 | 2/2001 | Rode et al. | |
| 6,270,557 B1 | 8/2001 | Millet | |
| 6,309,445 B1 | 10/2001 | Gittleman | |
| 6,409,800 B1 | 6/2002 | Ojo et al. | |
| 6,444,601 B1 | 9/2002 | Purcell, Jr. et al. | |
| 6,458,187 B1 | 10/2002 | Fritz et al. | |
| 6,582,607 B2 | 6/2003 | Coker et al. | |
| 6,596,256 B1 | 7/2003 | Ojo | |
| 6,616,732 B1 | 9/2003 | Grandmougin et al. | |
| 6,743,745 B2 | 6/2004 | Jaussaud et al. | |
| 6,918,948 B2 | 7/2005 | Jaussaud et al. | |
| 7,300,899 B2 | 11/2007 | Weston et al. | |
| 7,445,745 B2 | 11/2008 | Peterson | |
| 7,582,583 B2 | 9/2009 | Bosch et al. | |
| 7,608,134 B1 | 10/2009 | Plee | |
| 2002/0170436 A1 | 11/2002 | Keefer et al. | |
| 2003/0051673 A1 | 3/2003 | Raymond et al. | |
| 2004/0156766 A1 | 8/2004 | Jaussaud et al. | |
| 2005/0119112 A1 | 6/2005 | Pfenninger et al. | |
| 2006/0272501 A1 | 12/2006 | Plee | |

FOREIGN PATENT DOCUMENTS

| | | |
|---|---|---|
| EP | 0519073 | 12/1992 |
| EP | 0826631 | 3/1998 |
| EP | 0831096 | 3/1998 |
| EP | 0940174 | 9/1999 |
| EP | 1092465 | 4/2001 |
| EP | 1192993 | 4/2002 |
| EP | 1199101 | 4/2002 |
| FR | 2678525 | 1/1993 |
| GB | 827043 | 2/1960 |
| GB | 1051621 | 12/1966 |
| JP | 5147926 | 6/1993 |
| JP | 11246214 | 9/1999 |
| WO | 9614916 | 5/1996 |
| WO | 0001478 | 1/2000 |
| WO | 0123089 | 4/2001 |
| WO | 03061820 | 7/2003 |

OTHER PUBLICATIONS

Notice of Opposition dated May 5, 2010, filed in the European Patent Office with respect to European Patent No. EP 1467811.

(Continued)

*Primary Examiner* — Sikarl Witherspoon
(74) *Attorney, Agent, or Firm* — Scott R. Cox

(57) ABSTRACT

A process for the production and use of a molecular sieve blend with improved performance characteristics produced by preparing or obtaining a hydrophilic zeolite, particularly a hydrophilic zeolite 3A with a low $SiO_2:Al_2O_3$ ratio, preparing or obtaining a hydrophobic silica binder, particularly a hydrophobic colloidal silica, mixing the zeolite with the silica binder to form a mixture, and forming the mixture into the molecular sieve blend.

20 Claims, 5 Drawing Sheets

(56) References Cited

OTHER PUBLICATIONS

Active Minerals Co., LLC (a division of ITC, Inc.), "Activ-Gel™ 208," Powerpoint presentation done by Alfred University, Alfred, New York, Apr. 2001. The Date of This Reference Is Disputed.

"Solax/Clarsol ATC" Supplier Specification of Elf-Atochem/CECA, dated Jan. 24, 1994.

Experimental Report "SMAR-05210," dated Oct. 17, 2005, on the determination of the tapped bulk density for inter alia Solax/Clarsol ATC and Acti-Gel 208, prepared by Grace GmbH & Co. KG.

Table 1

Table 3

Table 5

Water Adsorption Kinetics
Ethanol Dehydration Zeolite
Test Mixture 90% Ethanol / 10% Water

| | |
|---|---|
| ——————— | Comparative Sample 4 (C-4), k = 0.1304 |
| — — — — — — | Inventive Sample (I-1), k = 0.4612 |
| - - - - - - - - - | Comparative Sample 3 (C-3), k = 0.0647 |
| — — — — — — | Comparative Sample 5 (C-5), k = 0.0617 |
| — — — — — | Comparative Sample 6 (C-6), k = 0.0603 |

Table 7

Table 8

MOLECULAR SIEVE ADSORBENT BLENDS AND USES THEREOF

BACKGROUND

Various embodiments relate to molecular sieve blends including a blend of a hydrophilic zeolite and a hydrophobic silica binder and processes of use of these molecular sieve blends, such as for dehydration of liquid and gaseous hydrocarbon streams, drying of cracked $C_1$-$C_4$ hydrocarbon gas streams, dehydration of ethanol feed streams, separation of hydrocarbon feed streams, and removal of various undesired materials from various types of feed streams.

Zeolites are hydrated metal alumino silicates having the general formula

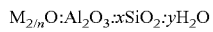

$$M_{2/n}O:Al_2O_3:xSiO_2:yH_2O$$

where M usually represents a metal of an alkali or alkaline earth group, n is the valence of the metal M, x varies from 2 to infinity, depending on the zeolite structural type and y designates the hydrated status of the zeolite. Most zeolites are three-dimensional crystals with a crystal size in the range of 0.1 to 30 μm. Heating these zeolites to high temperatures results in the loss of the water of hydration, leaving a crystalline structure with channels of molecular dimensions, offering a high surface area for the adsorption of inorganic or organic molecules. Adsorption of these molecules is dependent upon the size of the zeolite channels. The rate of adsorption is limited by the laws of diffusion.

Zeolites are used for a number of processes. The choice of zeolite is important in a number of chemical processes well known to those skilled in the art. For example, catalytic processes of interest using zeolites in the petrochemical industry include reforming, hydrocracking, dewaxing, isomerization, fluid catalitic cracking (FCC), partial oxidation, alkylation and disproportionation of aromatics. Zeolites are also used for dehydration, adsorption of various compounds from feed streams and separation of various hydrocarbons in a feed stream.

Molecular sieves have been advantageous for a number of processes as the diffusion of materials into and out of the pores can be facilitated based on the pore size that is present within the particular molecular sieve. (For purposes of this disclosure "zeolite" and "molecular sieve" have the same meaning.)

One limitation on the utilization of zeolites is their extremely fine particle size. Large, naturally-formed agglomerates of zeolite crystals break apart easily. In addition, because the pressure drop through a bed containing only such fine zeolite crystals is prohibitively high, these zeolite crystals cannot be used alone in fixed beds for various dynamic applications, such as drying of natural gas, drying of air, separation of impurities from a gas stream, separation of some gaseous and liquid product streams and the like. Therefore, it is necessary to agglomerate these zeolite crystals with binder materials to provide an agglomerate mass containing the zeolite crystals, which exhibits a reduced pressure drop.

To permit the utilization of zeolite crystals, different types of clays have conventionally been used as the binder materials for those crystals, wherein the clay binders have generally been selected from attapulgite, palygorskite, kaolin, sepiolite, bentonite, montmorillonite and mixtures thereof, particularly attapulgite.

In one example of the utilization of a molecular sieve adsorbent, water is removed from a cracked gas stream, for example, for the production of ethylene. The molecular sieve adsorbent is utilized immediately before a cryogenic process to remove water so that ice is not created during the process. However, inherent in the process is the fact that the hydrocarbon feed stream contains unsaturated hydrocarbons, such as alkenes, which are very reactive. These unsaturated hydrocarbons tend to form oligomers and polymers, which act as bed fouling agents and are commonly referred to as green oil or coke. These agents block adsorption channels and reduce the working capacity of the bed for dehydration. Accordingly, it is also important that the molecular sieve adsorbents produce very low quantities of green oil or coke during an adsorption process. Many of the clay binders that are traditionally used as binder materials with the zeolites contain metallic acid sites that encourage polymer/oligomer formation by a catalytic reaction. Conventionally, these clay binder materials are treated with a phosphate solution to reduce this catalytic activity. Notwithstanding, there are still issues associated with the production of green oil/coke during processes for treatment of hydrocarbon feed streams when clay materials are used as the binder material with zeolites.

Silica has sometimes been used as a binder material with high silica molecular sieves to form catalyst agglomerates for specialty catalytic reactions, wherein the molecular sieves used have included, for example, ZSM-5, Y zeolites and SAPO zeolites. Because of the hydrophobic nature of both the silica binders and the high silica zeolites, these catalytic materials have been limited in use to organic reactions. For example, these hydrophobic silica binders blended with hydrophobic high silica zeolites have been utilized as catalytic materials in the petrochemical industry for reactions including reforming, hydrocracking, dewaxing, isomerization, partial oxidation, alkylation, disproportionation of aromatics, and particularly as fluid catalytic cracking catalysts. These catalytic reactions conventionally utilize hydrophobic zeolites having a high silica content, wherein the $SiO_2$:$Al_2O_3$ ratio is at least 50, preferably greater than 200 and as high as 600 or so. To enhance the high silica content of these zeolites, they are often dealuminized to increase their silica:alumina ratio, making them even more hydrophobic. The silica binders used with these catalysts are also required to be highly hydrophobic. Binders used to produce catalysts for these catalytic reactions are not included within this disclosure. Further, the binders of this disclosure are not conventionally utilized to form these catalysts.

One problem with many conventionally formed zeolite agglomerate blends is decreased diffusion. The larger the diameter of the formed zeolites, the slower the rate of diffusion of the molecules to be adsorbed. Particularly in the field of pressure swing adsorption, this effect is highly adverse to short cycle time and thus to productivity. Enhanced kinetic values or faster mass transfer rates can result in shorter cycle time and lower power consumption and thus higher adsorbent productivity.

It has been recognized that a reduction in the particle size of formed zeolites leads to shorter mass transfer zones and shorter cycle times. This is based on the assumption that the time needed for adsorbates to travel through the macropores of the adsorbents limits the cycle time, i.e. macropore diffusion is the rate limiting step in these processes. The size of the pores in these zeolites can be improved by adding pore forming compounds to the zeolite before the agglomerate forming step.

Accordingly, it is one intent to disclose a process for the production of a molecular sieve blend which is effective and highly selective for the removal of water from hydrocarbon feed streams, such as those containing ethanol or cracked gases.

It is a still further intent to disclose molecular sieve blends which maintain their physical properties and diffusion capabilities even with a reduced quantity of binder than is conventionally used.

It is a still further intent to disclose molecular sieve blends which limit the production of undesired oligomers and polymers during utilization.

It is an additional intent to disclose a process for the preparation of molecular sieve blends with enhanced diffusion rates.

It is a still further intent to disclose a process for the production of molecular sieve blends containing a hydrophobic silica binder that are effective and selective for adsorption processes.

It is a still further intent to disclose a molecular sieve blend comprising a low silica, hydrophilic zeolite blended with a hydrophobic silica binder.

It is a still further intent to disclose a process for drying a feed stream comprising passing the feed stream over a molecular sieve adsorbent blend comprising a low silica, hydrophilic zeolite and a hydrophobic silica binder.

It is a still further intent to disclose a process for the separation of polar materials using a molecular sieve blend comprising a zeolite, particularly a low silica hydrophilic zeolite, more particularly a low silica hydrophilic zeolite 3A, and a hydrophobic binder, particularly a hydrophobic colloidal silica binder, more particularly a hydrophobic colloidal silica binder.

It is still further intent to disclose a process for separation of components of a gaseous or liquid feed stream comprising passing that gaseous or liquid feed stream over a molecular sieve blend comprising a low silica hydrophilic 3A zeolite powder and a hydrophobic colloidal silica binder.

These and other intents are obtained from the processes for production, the processes for use and the products of the various embodiments disclosed herein.

SUMMARY OF THE EMBODIMENTS

One embodiment is a molecular sieve blend comprising a hydrophilic zeolite, particularly a low silica hydrophilic zeolite 3A, blended with a hydrophobic silica binder, particularly a hydrophobic colloidal silica binder.

An additional embodiment is a process for drying a gaseous or liquid hydrocarbon feed stream, such as an ethanol feed stream, comprising passing the feed stream over or through a molecular sieve blend comprising a zeolite, particularly a low silica, hydrophilic zeolite 3A, blended with a hydrophobic silica binder, particularly a hydrophobic colloidal silica binder which is selective.

An additional embodiment is a process for the separation of components of a hydrocarbon gaseous or liquid feed stream comprising passing the feed stream over or through a molecular sieve blend comprising a zeolite, particularly a low silica, hydrophilic zeolite, blended with a hydrophobic silica binder, particularly a hydrophobic colloidal silica binder.

Figure 1:
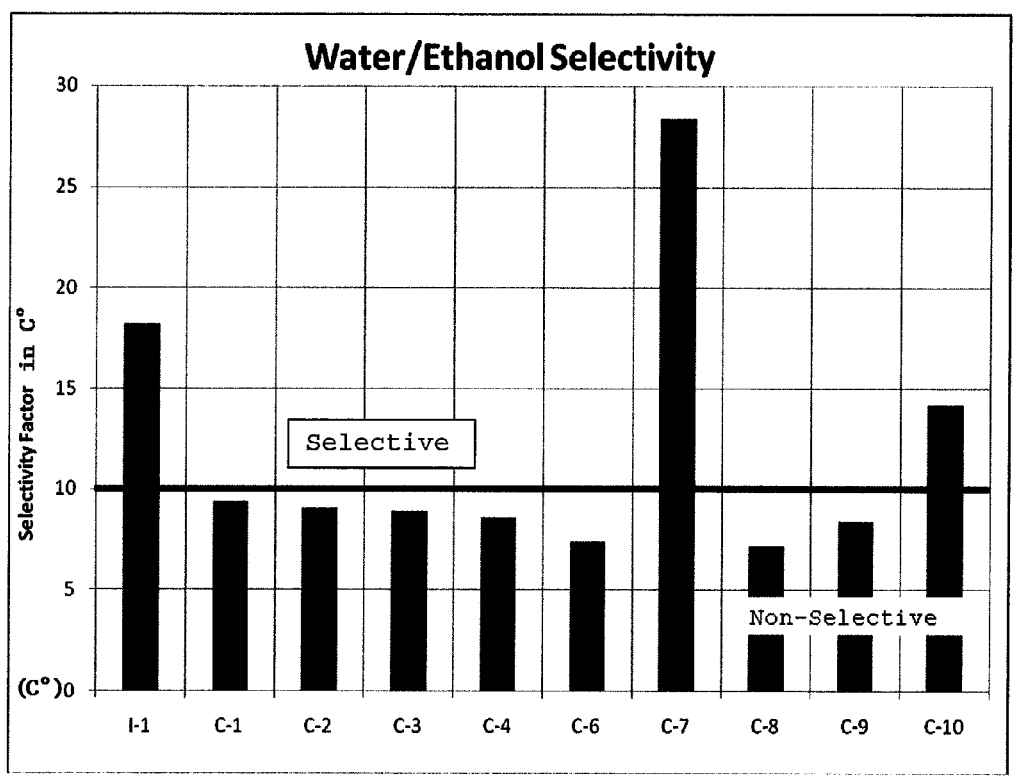
FIG. 1 is Table 1 which lists the maximum increase in temperature during the test process for various sample products described in Example 1.

Among those benefits and improvements that have been disclosed, other objects and advantages will become apparent from the following description taken in conjunction with the accompanying drawings. The drawings constitute a part of the specification and include exemplary embodiments and illustrate various objects and features thereof.

DETAILED DESCRIPTION OF ONE EMBODIMENT

One embodiment is a molecular sieve blend formed from a hydrophilic zeolite blended with a hydrophobic silica binder and processes for formation and use of that blend.

This embodiment is based on the surprising discovery that the adsorption rate and selectivity of a molecular sieve product is dependent not only upon the choice of the zeolite, but also the type and characteristics of the binder blended with the zeolite to form the molecular sieve blend. It has been surprisingly discovered that the same type of zeolite, when blended with different types of binders, produces zeolite blends which exhibit entirely different performance characteristics, depending upon the binder that is used. (For purposes of this disclosure, the phrases "adsorption rate" or "absorption rate" or "sorption rate" or "mass transfer rate" mean the rate at which the adsorbate loading in a feed stream changes over a given period of time for a given adsorption process.)

The prior art suggests that the adsorption rate and selectivity of a molecular sieve adsorbent is a function of the porosity and particle size of the molecular sieve only. The prior art also suggests that the adsorption rate and selectivity of a molecular sieve used in a hydrocarbon feed stream is a function of the hydrophobicity of each of the components of the molecular sieve blend. For example, conventional zeolite adsorbent blends used with hydrocarbon feed streams utilize zeolites and binders which are both hydrophobic. Thus, when zeolite blends are conventionally used for non-polar separations, such as removal of volatile organic compounds (VOC's), the zeolite:binder system is conventionally comprised of two components which are both hydrophobic. In contrast, zeolite blends conventionally used for polar separations, such as water removal from methanol or cracked gases, are conventionally comprised of a zeolite:binder system, where both components are hydrophilic.

It has now been surprisingly discovered that the type of binder that is used to bind zeolite crystals plays an important role in the adsorption rate and selectivity of the zeolite blend. It has also been surprisingly discovered that when a polar separation is desired, such as for the adsorption of water from a hydrocarbon feed stream, the use of a hydrophilic zeolite and a hydrophobic silica binder is surprisingly effective to remove water and also surprisingly exhibits improved performance over prior art zeolite blends. These improvements include, but are not limited to, a reduction in the production of green oil or coke, enhanced adsorption characteristics and improved selectivity.

The zeolites, as used for preparing the molecular sieve blend according to the present invention, can be in any form. Preferably the zeolites are in the form of crystals, crystal aggregates, or mixtures thereof. It is also possible to use a mixture of different types of zeolites for preparing the molecular sieve blend. Within the context of the present invention, the term "molecular sieve blend" refers to a blend of materials comprising zeolite(s) and binder material(s) that can be formed into a shaped material suitable for the desired absorption processes. The molecular sieve blend is preferably formed by preparing a mixture comprising one or more types of zeolite, one or more types of binder material, and optionally, one or more pore forming agents. The mixture can then be further processed, e.g. formed into a desired shape and calcined, as described herein. In one preferred embodiment, the molecular sieve blend is prepared by using a mixture comprising or consisting of one or more types of hydrophilic zeolites, one or more types of hydrophobic silica, as a binder, and optionally one or more pore formers. Various types of zeolites may be used to form these zeolite blends, depending on the material to be adsorbed and the remaining materials in the feed stream. The zeolites, as used for preparing the molecular sieve blend, can have any crystal size, preferably in a range from 0.1 to 30 µm.

Different types of zeolites that have been used for adsorption of various materials include, for example, zeolite A, zeolite X, zeolite Y, zeolite ZSM-5, zeolite Beta, synthetic mordenite and blends thereof. The ion-exchange of these zeolites can also vary, but generally utilizes alkali and/or alkaline earth metals.

One example of an adsorbent system using the zeolite blends disclosed herein adsorbs water from an ethanol stream. For ethanol dehydration, the co-adsorption of ethanol is a major process inhibitor as ethanol is the bulk component in the process feed mixture. Co-adsorption of ethanol hinders the dehydration process because: 1) water adsorption sites on the zeolite become occupied or blocked with water, and 2) the desired product (ethanol) is lost during the purge cycle, resulting in lower (relative) product recovery. As the process for dehydration of ethanol is a process swing adsorption process, the goal of any product development includes improvement in both the adsorption of the adsorbate (water selectivity) and reduction in the adsorption of the desired product (ethanol).

Another use for the zeolite blends disclosed herein is the drying of cracked gases, more particularly the drying of a thermally cracked hydrocarbon gas stream by contacting said stream with zeolite blends. During such process, if water is not removed, hydrocarbon hydrates are formed which deposit as solids which can plug pipe lines, freeze valves and regulators and foul fractionating columns, wherein the cracked gas is demethanized for the recovery of unsaturated hydrocarbons. For example, during the conventional separation of ethylene, the temperature of the feed stream is sufficiently low and the pressure is sufficiently high that any water present in the feed stream often forms hydrates with ethylene. These hydrates accumulate to produce solids which may render the column incapable of passing the required vapor or liquid load. One method of solving this problem has been by use of desiccants. However, desiccants have disadvantages because of their short life. Another method of drying cracked gases is the use of zeolite adsorbents. However, because of the size of zeolite crystals, it is necessary for them to be mixed with a binder material to form agglomerates before use for this process. Problems associated with the use of these binders have been previously discussed.

A particularly effective zeolite that is useful for removal of water from an ethanol:water mixture and for the drying of cracked hydrocarbons is zeolite 3A. Zeolite 3A is particularly effective for the adsorption of water because of the size of the pore openings in this zeolite, which permits the passage of water molecules but restricts the passage of larger hydrocarbon molecules, including ethanol. While zeolite 3A is an especially useful zeolite for this and related processes, other zeolites may also be used for other processes, such as the use of zeolite 5A for iso/normal paraffin separation.

To enhance the water adsorption capability of zeolites, it has been surprisingly discovered that, to be effective, the zeolites, particularly zeolite 3A, can be ion-exchanged with potassium to at least 25 percent, in another embodiment at least 45 percent, in a further embodiment at least 55 percent, and in an additional embodiment at least 80 percent. The remaining cations of the zeolite can be sodium ions or the zeolite can be exchanged with other alkali or alkaline earth metal ions that do not interfere with the adsorption by the zeolite 3A of water or the passage of the hydrocarbons through the zeolite 3A blend.

In one particular embodiment, the zeolite chosen is a low silica, hydrophilic zeolite with a ratio of $SiO_2:Al_2O_3$ less than 50, alternatively less than 20, alternatively less than 10, alternatively less than 5 and as low as 1. It is useful to reduce the SiO2:Al2O3 ratio of these zeolites to produce zeolites particularly effective for the adsorption of polar substances, particularly water. Processes for the production of low silica zeolites are well known. Low silica zeolites, because they are hydrophilic, as defined in Example 4 hereinafter, are more effective as adsorbents of water from hydrocarbon/water mixtures than are high silica zeolites, which are commonly used, for example, for catalytic reactions. (Zeolite blends useful for such catalytic reactions are not disclosed herein. Further, the zeolite blends of this disclosure are not conventionally utilized for these catalytic reactions.) In addition, such low silica zeolites reduce the likelihood of production of green oil and coke during such processes.

Binder materials are necessary for use with these hydrophilic zeolites to bind the individual zeolite crystals together to form shaped products which reduce the pressure drop during the adsorption process. However, in the past, the binder materials have not enhanced the adsorption capability and selectivity of the zeolite. In fact, prior art binder materials have generally reduced the adsorption capacity of the zeolites and have resulted in the production of undesirable oligomers and polymers (green oil and coke). Binder materials which have been utilized with zeolites in the past generally include clay products, such as kaolin, palygorskite-type minerals, particularly attapulgite, and smectite-type clay minerals, such as montmorillonite or bentonite. These clay products were chosen for various reasons including their hydrophilicity. These clay binders were used singly or in mixtures of two or more different types of clay binders.

These clay binders, particularly attapulgites, often have a high metal content. Such metals can cause carbon polymerization to occur at the acid sites on the clay binder during utilization in the processes disclosed herein. This often results in the production of coke and green oil, resulting in a shortened life span for the zeolite blend. These prior art zeolite/clay binder agglomerate materials, when used for adsorption or separation processes often exhibited a high incidence of coking in the presence of unsaturated hydrocarbons. One advantage of the zeolite blend disclosed herein is a reduction in the polymerization of hydrocarbons and a reduction in the production of coke and green oil and thus, an increase in the life expectancy of the adsorbent.

It has been surprisingly discovered that improved performance from the adsorbent materials can be achieved when the binder material that is used is a silica material, especially when the silica material is hydrophobic. For purpose of this disclosure, a silica material is "hydrophilic" or "hydrophobic" based on the definition contained in Example 4 and Tables 4-6.

In one embodiment, the molecular sieve blend comprises a low silica zeolite with a ratio of $SiO_2:Al_2O_3$, as defined herein, and silica, preferably colloidal silica, wherein the silica preferably has been treated to make at least a portion or substantially all of its surface hydrophobic. The silica can be treated according to methods well known in the art to produce a hydrophobic surface. For example, the treatment can be carried out by treating the silica with a hydrophobizing agent e.g. an agent comprising a hydrolyzable silicon compound having at least one alkoxy group in the molecule or a hydrolyzate thereof.

The hydrophobic silica material that is used as the binder is preferably a colloidal silica. Colloidal silicas are generally suspensions of amorphous, non-porous and typically spherical silica particles in a liquid phase. One example is Ludox® produced by Grace Davison, wherein the pH of this colloidal silica is about 10. The concentration of silica in the colloidal silica, the silica ratio of $SiO_2:Al_2O_3$, the size of the silica particles and the surface area of the silica particles may vary in the colloidal silica.

This silica binder material is preferably substantially pure or pure silica. It has been determined that when blends are made of silica and conventional clay materials, such as attapulgite clay, the blended materials perform substantially worse, for example, for the adsorption of water from hydrocarbon/water mixtures than do pure colloidal silica binders. In fact, it has been discovered that these "hybrid" mixtures result in a surprisingly significant loss of effectiveness and selectivity of the zeolite/binder material that forms the adsorbent material.

Generally the process to produce the molecular sieve blend with improved adsorption performance characteristics is as follows:
- prepare or obtain the desired zeolite, which is chosen based on the material being absorbed,
- prepare or obtain an hydrophobic silica binder, preferably an hydrophobic colloidal silica,
- mix the zeolite with the hydrophobic silica binder in an aqueous mixture,
- form a shaped, uncalcined material from the mixture, and
- calcine the material to form the molecular sieve adsorbent blend product.

In an additional alternative processing step, a pore forming agent may be added to the hydrophilic zeolite/hydrophobic silica mixture to enhance the total pore volume of the end product and to assist in water balance during bead formation. Among acceptable pore forming agents are fibers, including rayon, nylon, sisal, flax and the like and organic polymers, including corn starch, starch derivatives, lignosulfonates, polyacrylamide, polyacrylic acid, cellulose, cellulose derivatives, such as carboxymethylcellulose, such as methocel F4M, and the like. The amount of the pore forming agent that may be added is from about 2 to about 15 percent, by weight of the final calcined product.

Once the appropriate zeolite material is chosen for a given application, such as a low silica, hydrophilic zeolite 3A for water adsorption, it is mixed with a hydrophobic silica binder, preferably a colloidal silica in the presence of water. The hydrophilic zeolite 3A powder and the hydrophobic silica binder are then blended together with water. The amount of hydrophobic silica binder that is utilized in relation to the hydrophilic zeolite, such as hydrophilic 3A zeolite, can range from 5 to about 30 percent by weight, alternatively from about 5 to about 20 percent and in a further alternative, from about 5 to about 10 percent of the final adsorbent blend. Conventional mixtures of zeolite and conventional attapulgite clay binders for adsorption processes utilize about 20 percent or more attapulgite clay.

The mixture is blended using a conventional blending device, such as a conventional mixer, until a mass of suitable viscosity for forming is obtained. The blended mixture is then formed into the appropriate shaped product, for example, by extrusion. Sufficient water is retained in or added to the mixture to make a formable mixture, i.e., one that can be easily extruded. The products can be formed in conventional shapes, such as beads, pellets, tablets or other such products. Once the formed products are produced into the appropriate shape, they are calcined, preferably at about 600° C., for about 30 minutes to 2 hours.

One embodiment also refers to a use of a molecular sieve blend comprising zeolite and silica binder, preferably a molecular sieve blend, as described herein, comprising a hydrophilic zeolite and a hydrophobic silica binder for removal of hydrophilic materials, preferably for dehydration of gaseous or liquid feed streams, preferably gaseous or liquid hydrocarbon feed streams. One embodiment also refers to an absorber for gaseous or liquid hydrocarbon-containing feeds comprising a molecular sieve blend comprising a hydrophilic zeolite and a hydrophobic silica binder. The term "absorber" as used in the context of the present invention relates to a device comprising a bed of the molecular sieve blend, wherein the device has means for passing the feed over or through the molecular sieve blend. The absorber provides that a feed stream enriched of a hydrophilic material/polar material, preferably water, that is introduced into the absorber can be withdrawn from the absorber with hydrophilic materials/polar materials being removed from the feed gas stream. The absorber does not catalyze a chemical reaction of the components of the feed gas stream. Preferably, the absorber has means for adjusting the pressure of the gaseous feed to the desired pressure for passing the feed over or through the molecular sieve blend bed. Within the context of one embodiment, "polar" materials are well recognized in the prior art. A preferred polar material is water.

Products produced by the disclosed processes show improved water adsorption rates. The adsorption rate can be determined using several different methods. For example, the water adsorption rate of the material can be determined by fitting a temperature profile data to a first order decay function represented by the expression $f=\alpha *e^{-kt}\square$. The slope of the curve, $-k$, represents the water adsorption rate for the material.

In another process to determine the adsorption rate of the molecular sieve adsorbent blend, the amount of the adsorbed product over a given period of time can be determined.

In a further process to determine the adsorption rate, the mass transfer zone of the blend can be compared to that of a conventional zeolite adsorption blend under given conditions. The shorter the mass transfer zone, the higher the adsorption rate.

Finally, the diffusion rate can be determined directly for certain gases or liquids. The higher the diffusion rate, the faster the adsorption rate.

It has been surprisingly discovered that by replacing a conventional clay binder with the same or lesser quantity of a hydrophobic silica binder, there is an improved water adsorption rate regardless of which method is used to measure that rate. This improvement in adsorption rate is at least about 10 percent and as high as 350 percent, compared to products containing conventional attapulgite clay binders.

It has also been surprisingly discovered that even when reduced quantities of a hydrophobic silica binder are utilized in an adsorbent product, in comparison to prior art adsorbent products using conventional clay binders, the rate of adsorption increases. This improvement is at least 10 percent and in many cases as much as 30 percent or more.

An additional surprising discovery is that by using a hydrophobic silica as a binder material, there is a significant reduction in the production of undesirable oligomers and polymers when the zeolite/hydrophobic silica blends are utilized as a dehydration agent. In addition, because of the reduction of the production of these oligomers and polymers, the life expectancy of the zeolite blend is also increased.

Further, using the products disclosed herein, there is less of a need for regeneration and lower regeneration temperatures resulting in additional cost savings.

In addition, there is an improvement in selectivity of the material that is desired to be adsorbed.

The hydrophobic silica binder can be blended with the hydrophilic zeolite and used for a number of different processes. For example, the blend of hydrophobic silica binder and hydrophilic zeolite can be used for drying a feed stream, such as for the removal of water from a gaseous or liquid ethanol stream. The blend can also be used for the removal of water from a gaseous or liquid hydrocarbon stream, such as the removal of water from a cracked gas feed stream. The blend of hydrophobic silica and a hydrophilic zeolite can also be used for the separation of hydrocarbons, such as the separation of n-paraffins from a mixture of iso-paraffins and n-paraffins. There are a number of other processes, particularly adsorption processes, for which this blend of hydrophobic silica and hydrophilic zeolite can be utilized which are disclosed herein. Notwithstanding, catalytic processes for the use of a blend of a zeolite with a silica binder are not disclosed herein. The zeolite/silica binder blend disclosed herein would not be useful for these catalytic processes.

These improvements are shown by the following examples. In these examples the sample materials are tested in the form as used for a molecular sieve blend.

EXAMPLES

Example 1

To compare the performance of various adsorbent materials and to show the surprising selectivity of a zeolite blend comprising a hydrophilic zeolite and a hydrophobic silica binder, samples of various adsorbent materials with different compositions are prepared or obtained. These compositions are compared to illustrate their selectivity for the removal of water from an ethanol stream using a process.

The selected adsorbent sample is dried overnight at 240° C. The sample is cooled in a desiccator to room temperature. 20 grams of the sample is placed in a 2 neck 50 ml round bottom flask. A thermocouple is inserted into the flask via a thermocouple injection port. The flask is capped and placed in a water bath maintained at 30° C. The sample is then allowed to equilibrate for 15 minutes to achieve temperature equilibrium. Using a glass syringe, 25 ml of a test solution (90/10 mixture of ethanol/water) is drawn from a master container, which also has been equilibrated in temperature to 30° C. The test solution is then injected into the flask and the resulting temperature profile is collected over 120 seconds. The maximum temperature rise exhibited from each material during this period is then used to calculate the selectivity of the material (a) by utilizing the following expression:

$\alpha = T\text{max} - T\text{initial}$

The basic premise of this testing procedure is that the more selective a material is for water, the higher the temperature rise during an adsorption process. It is believed that a material that exhibits low selectivity shows a lower temperature rise due to larger amounts of ethanol co-adsorption which blocks active zeolite sites. The data from the tests of various materials is collected and is shown in Table 1, FIG. 1. Table 1 shows the maximum increase in temperature during the test process. The maximum increase in temperature may be exhibited by the test materials at various times throughout the test process.

Pursuant to this test, a "strong" separation factor is a value of 30° C. with no separation at 0° C. The defined threshold for a "non-selective material" is less than 10° C. The determination of a threshold of 10° C. for a "non-selective material" was determined after observation of materials known for their selectivity or lack of selectivity when analyzed alone. For example, for materials that are hydrophobic, such as a high silica ZSM-5 and pure silica (such as colloidal silica HS-30 from WR Grace), poor selectivity results are obtained. In addition, a number of hydrophilic materials are tested, the compositions of which are described below. Not surprisingly, pure zeolite 3A, a known hydrophilic material, has a high water selectivity. In addition, Actigel 208, which is comprised of an attapulgite material, has a high selectivity factor of about 18° C. The only other material which exhibits a selectivity factor above 10° C. is a blend of 10% colloidal silica (HS-30 from WR Grace) with 90% zeolite 3A (from Zeochem) (referenced as NGO-302 or I-1). The tested materials are described below and a comparison of their selectivity is shown in Table 1. (For purposes of this disclosure, a material is "selective" for the adsorption of water in a water/ethanol mix when tested using the described process if the increase in temperature is greater than 10° C. A material is "non-selective" if the increase is less than 10° C.)

Sample Descriptions:

Inventive Sample (I-1)
This material is 10% colloidal silica (HS-30 from WR Grace) and 90% 3A Zeolite powder from Zeochem. The material is in the form of spheres.

Comparative Sample 1 (C-1):
This material is a 10% binder with 90% 3A zeolite powder from Zeochem, wherein the binder is a 50/50 blend of colloidal silica (HS-30) and Actigel 208 clay (from Active Minerals). The material is in the form of spheres.

Comparative Sample 2 (C-2):
The material is comprised of 10% Actigel 208 attapulgite clay from Active Minerals and 90% 3A Zeolite powder from Zeochem. The material is in the form of spheres.

Comparative Sample 3 (C-3):
Manufactured by Ceca (Arkema is parent company). The material is comprised of 20% attapulgite clay and 80% 3A zeolite powder. The material is in the form of spheres.

Comparative Sample 4 (C-4):
Manufacture by Zeochem. The material is comprised of 20% attapulgite clay (from Active Minerals) and 80% 3A zeolite powder. The material is in the form of spheres.

Comparative Sample 5 (C-5):
Manufactured by WR Grace. The material is comprised of 20% attapulgite clay and 80% 3A zeolite powder. The material is in the form of spheres.

Comparative Sample 6 (C-6):
Manufactured by Hengye. The material is comprised of 20% attapulgite clay and 80% 3A zeolite powder. The material is in the form of spheres.

Comparative Sample 7 (C-7):
Manufactured by Zeochem. This is a Zeolite 3A powder.

Comparative Sample 8 (C-8):
Manufactured by WR Grace. This is a colloidal silica solution with a 30% $SiO_2$ content. Before testing the colloidal silica material is dried at 80° for about 1 hour, 110° C. for about 1 hour, 250° C. for 1 hour, and 550° C. for about 1 hour to produce a $SiO_2$ powder.

Comparative Sample 9 (C-9):

Manufactured by Zeochem. This is a high Si/Al ratio (600) ZSM-5 zeolite powder. This material is in an extruded form.

Comparative Sample 10 (C-10):

Actigel 208 (manufactured by Active Minerals). This is an attapulgite clay powder.

TABLE 2

| | $EtOH/H_2O$ Selectivity (° C.) |
|---|---|
| I-1 | 18.2° C. |
| C-1 | 9.4° C. |
| C-2 | 7.4° C. |
| C-3 | 8.9° C. |
| C-4 | 8.6° C. |
| C-6 | 9.4° C. |
| C-7 | 28.4° C. |
| C-8 | 7.2° C. |
| C-9 | 8.4° C. |
| C-10 | 14.2° C. |

It is clear from Tables 1 and 2 that even though pure colloidal silica has a very low water selectivity individually, because it is hydrophobic, when combined with a zeolite 3A powder to form NGO-302 (I-1), the combined materials have a high selectivity factor for water in the water:ethanol mixture, almost as high as that of a conventional clay binder used alone, which is hydrophilic. None of the other blends of materials showed selectivity within the range of the combination of hydrophilic zeolite 3A and hydrophobic silica binder, including several combinations of hydrophilic 3A zeolite with conventional attapulgite clay binders.

Example 2

To compare the performance of various materials for the production of coke, a coking test is run with five separate samples. The test illustrated the effectiveness of the use of a blend of a hydrophobic silica binder with a hydrophilic zeolite over other samples to reduce the production of coke during a standard coking test.

0.1 grams of each sample is weighed and dried overnight and is then placed in a desiccator. The sample is exposed for 12 hours at 450° C. to a gas stream comprising 4% by volume of a reactive diene (1,3-butadiene) with the balance of the gas stream comprising nitrogen at a gas flow rate of 60 ml/min. The sample is monitored for its tendency to form green oil resulting in a carbon deposition, which is referenced as coke.

The samples tested are selected from samples from Example 1, along with a new sample C-11.

Comparative Sample 7 (C-7):
Manufactured by Zeochem. This is the zeolite 3A powder, that is used for the production of Z3-03 (I-1).

Comparative Sample 5 (C-5):
Manufactured by WR Grace. The sample is comprised of 20% attapulgite clay and 80% 3A zeolite powder. The material is in the form of spheres.

Comparative Sample 11 (C-11):
Manufactured by UOP. The sample is comprised of 20% clay and 80% 3A zeolite powder. The sample is in the form of extrusions.

Comparative Sample 3 (C-3):
Manufactured by Ceca (Arkema is parent company). The sample is comprised of 20% attapulgite clay and 80% 3A zeolite powder. The sample is in the form of spheres.

Comparative Sample 4 (C-4):
Manufacture by Zeochem. The sample is comprised of 20% attapulgite clay (from Active Minerals) and 80% 3A zeolite powder. The sample is in the form of spheres.

Inventive Sample (I-1)
This sample is 10% colloidal silica (HS-30 from WR Grace) and 90% 3A Zeolite powder from Zeochem. The sample is in the form of spheres.

Figure 2:
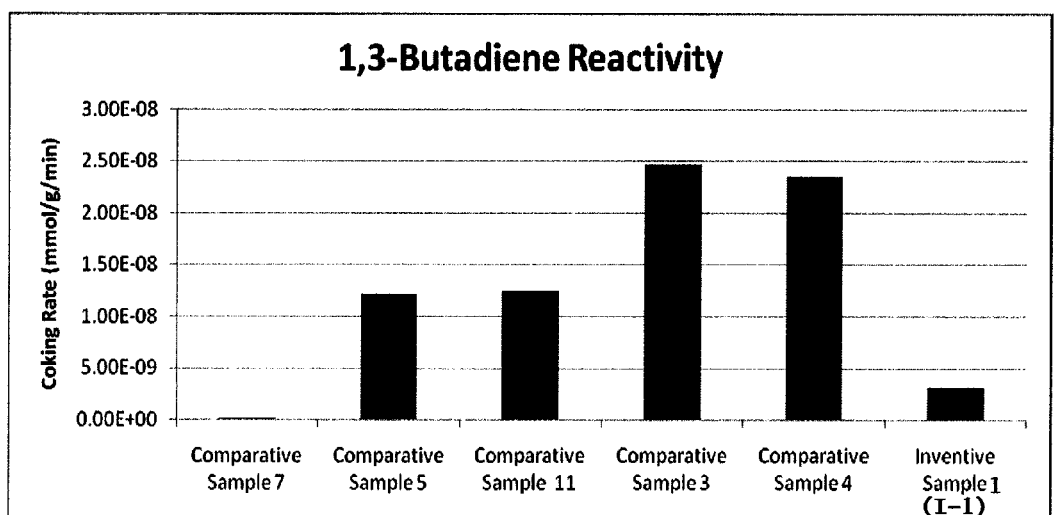
FIG. 2 is Table 3 which compares the reactivity of various sample products from Example 2 for the production of coke.

The results of the tests run on these five samples is shown in Table 3, FIG. 2.

TABLE 4

| | "Coking" Rate mmol/g/min |
|---|---|
| I-1 | $3.18 \times 10^{-9}$ |
| C-3 | $2.47 \times 10^{-8}$ |
| C-4 | $2.36 \times 10^{-8}$ |
| C-7 | $2.63 \times 10^{-10}$ |
| C-11 | $1.26 \times 10^{-8}$ |
| C-5 | $1.22 \times 10^{-8}$ |

As is clear from the results shown in Tables 3 and 4, the composition comprising a hydrophobic colloidal silica binder mixed with a hydrophilic zeolite 3A (I-1) performed better than any of the comparative clay binder examples by producing less total coke during the test procedure.

Example 3

To compare the water adsorption rates of various materials, an adsorption test is run comparing the water adsorption kinetics of materials determined by fitting a temperature profile data to a first order decay function, as described previously. The products chosen are selected from the group of samples used in Example 1.

The sample to be tested is dried overnight at 240° C. The sample is cooled in a desiccator to room temperature. 20 grams of the sample is placed in a 2 neck 50 ml round bottom flask. A thermocouple is inserted into the flask via a thermocouple injection port. The flask is capped and is placed into a water bath maintained at 30° C. The sample is then allowed to equilibrate for 15 minutes to achieve temperature equilibrium. Using a glass syringe, 25 ml of a test solution (90/10 mixture of ethanol/water) is drawn from the master container, which also has been equilibrated in temperature to 30° C. The test solution is then injected into the flask and the resulting temperature profile is collected. The data is then analyzed by fitting a first order decay model to the resultant profile as discussed above. The slope from that decay is representative of the apparent water mass transfer.

Figure 3:
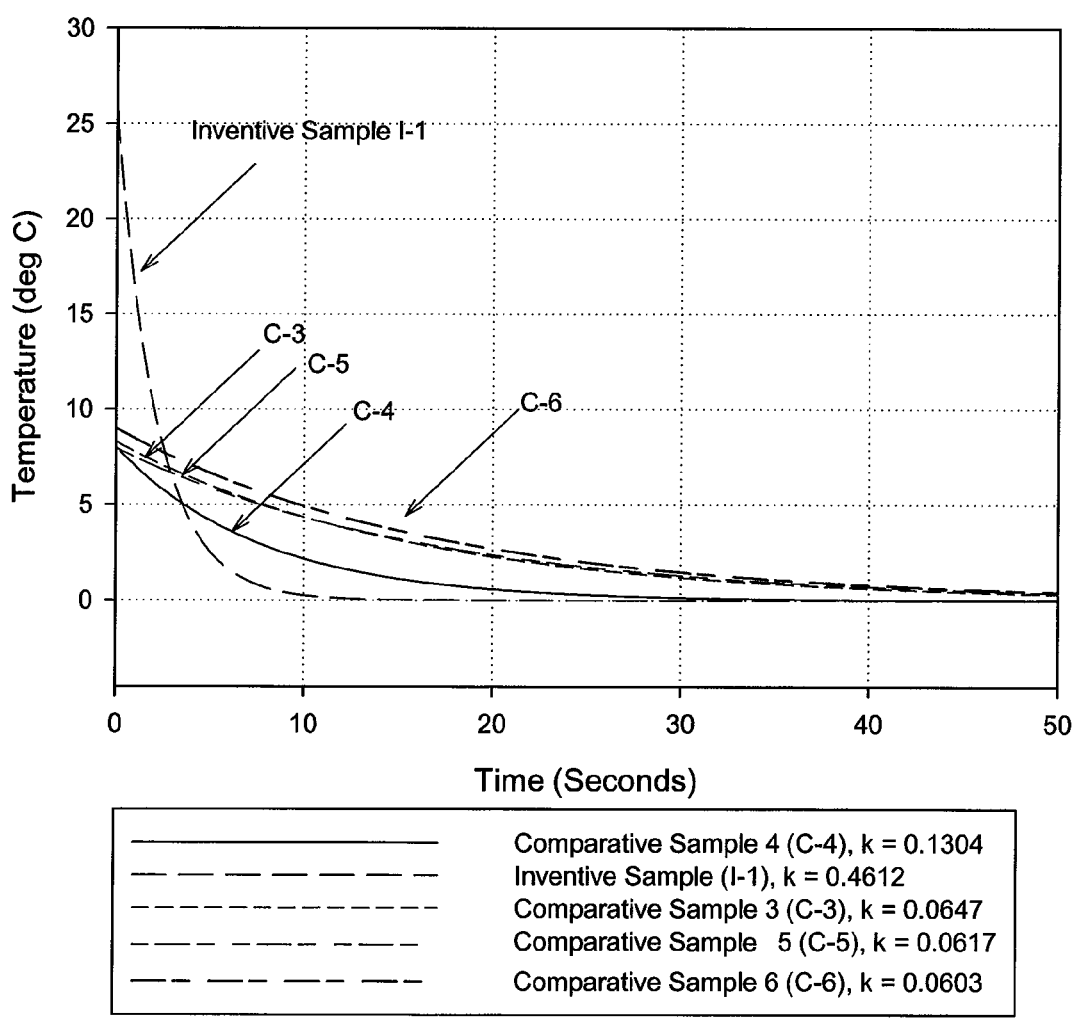
FIG. 3 is Table 5 which compares the water adsorption kinetics of various sample products from Example 3.

As is clear from the tests shown in Table 5, FIG. 3, the most favorable water adsorption kinetics disclosed is by NGO-302 (I-1). The high degree of heat evolution and steepness of the thermal front for this sample indicates very favorable and fast water adsorption in the presence of ethanol. This uptake is surprisingly 3-4 times higher than the best prior art material, indicating superior water uptake properties.

Example 4

To classify a material as "hydrophobic" or "hydrophilic", a test was developed. The test comprised taking approximately 10 grams of a test sample and drying it for about four (4) hours at 230° C. The material to be tested is in the form of particles. As beads, they pass through a 4 mm×4 mm mesh. As extrusions, they have a ⅛" diameter (3.1 mm). The sample materials are tested in the form as used for the molecular sieve blend. The dried sample is then weighed and placed in a flow of air and hydrated to a relative humidity of 80% at 1 atm and 20° C. The resulting weight gain from water adsorption is then recorded and plotted to determine the maximum water capacity, as well as the relative water adsorption rate.

The samples are evaluated for total water adsorption capacity as well as relative adsorption rate. To measure the ultimate adsorption capacity, the final weight gain after 7.5 hours is determined. A relative rate of water adsorption of the materials is also calculated after 60 minutes. A sample is considered "hydrophobic" if it has an adsorption capacity of less than 5.5 (wt.) after 7.5 hours and a relative rate of adsorption of less than 0.05% (wt.) per minute after 60 minutes. From that analysis, the zeolite sample (C-7) as well as the clay binders used alone (C-10 and C-12) exhibit adsorption characteristics consistent with "hydrophilic" materials, whereas the silica binder (C-8) shows "hydrophobic" characteristics.

Comparative Sample 7 (C-7):
Manufactured by Zeochem. This is a zeolite 3A powder, that is used for the production of Z3-03. (I-1)
Comparative Sample 10 (C-10):
Actigel 208 (manufactured by Active Minerals). This is an attapulgite clay powder.
Comparative Sample 8 (C-8):
Manufactured by WR Grace. This is a colloidal silica solution with a 30% $SiO_2$ content used in the production of I-1. Before testing the colloidal silica material is dried at 80° for about 1 hour, 110° C. for about 1 hour, 250° C. for about 1 hour, and 550° C. for about 1 hour to produce a $SiO_2$ powder.
Comparative Sample 12 (C-12):
Minugel MB (manufactured by Active Minerals). This is an attapulgite clay powder.

Figure 4:
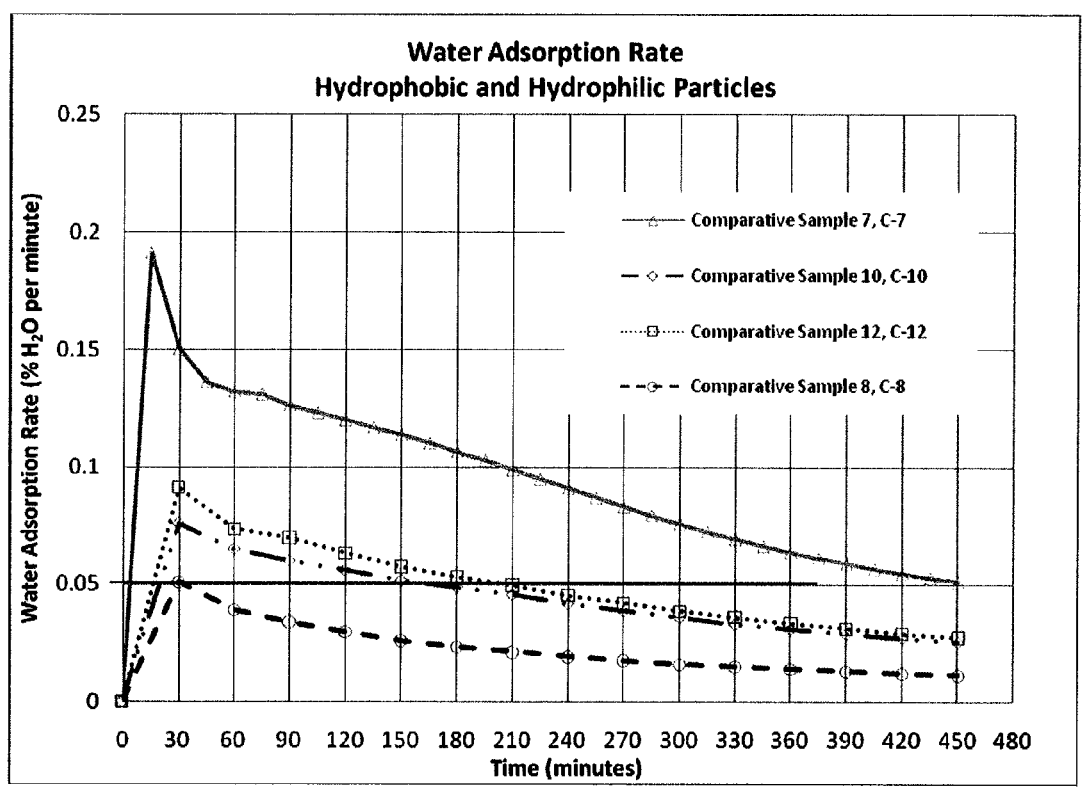
FIG. 4 is Table 7 which compares the water adsorption rate for various samples from Example 4.
Figure 5:
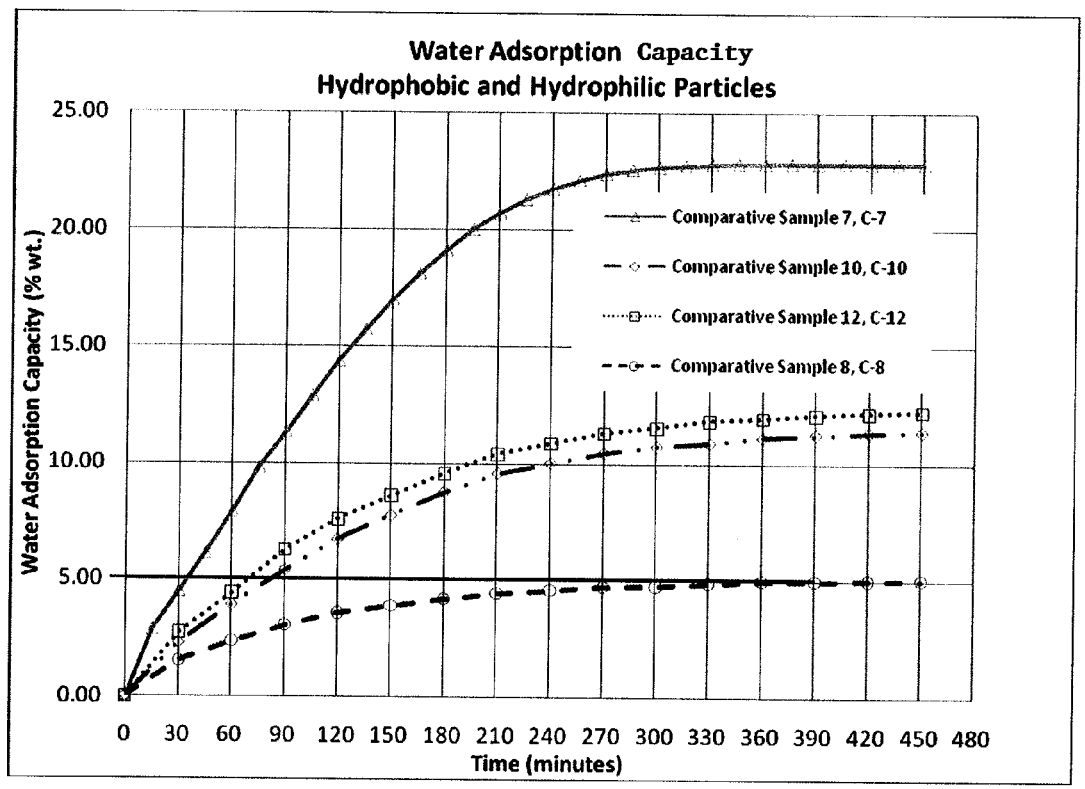
FIG. 5 is Table 8 which compares the water adsorption capacity for various products from Example 4.

The results of these tests are shown in Tables 6, 7 (FIG. 4) and 8 (FIG. 5) as follows:

TABLE 6

|  | Ultimate H2O Capacity % (wt.) @ $t_{450}$ | H2O Adsorption Rate % (wt.) per min @ $t_{60}$ |
|---|---|---|
| C-7 | 22.89 | 0.130 |
| C-10 | 11.50 | 0.0652 |
| C-8 | 5.03 | 0.0393 |
| C-12 | 12.35 | 0.0737 |

Although the invention has been described in detail, it is clearly understood that the disclosure is not to be taken as any limitation on the invention.

The invention claimed is:

1. A process for dehydration of a gaseous or a liquid hydrocarbon feed stream containing water comprising
    passing the components of the hydrocarbon feed stream over or through a molecular sieve blend produced by a process comprising preparing or obtaining a hydrophilic zeolite;
    preparing or obtaining a hydrophobic silica binder comprising a colloidal silica;
    mixing the hydrophilic zeolite with the hydrophobic silica binder and calcining at about 600° C. to produce a mixture; and
    forming the molecular sieve blend from the mixture into a shaped body selected from beads, pellets, tablets and extrudates.

2. The process of claim 1, wherein the hydrophilic zeolite comprises a zeolite 3A.

3. The process of claim 1, wherein the hydrophilic zeolite has a $SiO_2/Al_2O_3$ ratio of less than 50.

4. The process of claim 2, wherein the hydrophilic zeolite has a $SiO_2/Al_2O_3$ ratio of less than 5.

5. The process of claim 1 wherein the hydrophobic silica binder comprises from about 5% to 30%, by weight, of the molecular sieve blend.

6. The process of claim 1 wherein the hydrophobic silica binder comprises from about 5% to 20%, by weight, of the molecular sieve blend.

7. The process of claim 1 wherein the hydrophobic silica binder comprises from about 5% to 10%, by weight, of the molecular sieve blend.

8. The process of claim 1, wherein the hydrophilic zeolite is ion exchanged with potassium ions to at least about 25 percent.

9. The process of claim 1, wherein the hydrophilic zeolite is ion exchanged with potassium ions to at least about 40 percent.

10. The process of claim 1, wherein the hydrophobic silica binder exhibits a water adsorption capacity after 7.5 hours of less than 5.5 wt.%.

11. The process of claim 1, wherein the hydrophobic silica binder exhibits a water adsorption rate per minute after 60 minutes of less than 0.05 wt.%.

12. The process of claim 1, wherein the hydrophilic zeolite exhibits a water adsorption capacity after 7.5 hours greater than 5.5%.

13. The process of claim 1, wherein the hydrophilic zeolite exhibits a water adsorption rate per minute after 60 minutes greater than 0.05 wt.%.

14. The process of claim 1, wherein the adsorbent blend has a mass transfer value of at least 0.20, as measured by the uptake of water in the presence of ethanol.

15. The process of claim 1, wherein the adsorbent blend exhibits a coking rate of less than $5.0 \times 10^{-9}$ mmol/g/min when the adsorbent blend is exposed to a nitrogen gas stream at 450° C. containing 4% by volume of 1,3-butadiene at a flow rate of 60 m/min.

16. The process of claim 1 wherein the selectivity of the mixture of the hydrophilic zeolite with the hydrophobic silica binder is greater than 10° C.

17. The process of claim 1 further comprising adding from about 0.25 to about 10 percent, by weight, of a pore forming agent to the mixture prior to forming the adsorbent blend.

18. A process for removal of water from a gaseous or liquid ethanol stream containing water comprising
    passing the ethanol stream over or through a molecular sieve blend produced by a process comprising
    preparing or obtaining a hydrophilic zeolite 3A;
    preparing or obtaining a hydrophobic silica binder comprising a colloidal silica;
    mixing the zeolite 3A with the hydrophobic silica binder and calcining at about 600° C. to produce a mixture; and
    forming the molecular sieve blend from the mixture into a shaped body selected from beads, pellets, tablets and extrudates.

19. A process to separate n-paraffins from a mixture of iso-paraffins and n-paraffins comprising
    passing the mixture over or through a molecular sieve blend produced by a process comprising preparing or obtaining a hydrophilic zeolite 3A;
preparing or obtaining an hydrophobic silica binder comprising a colloidal silica;
mixing the zeolite with the hydrophobic binder and calcining at about 600° C. to produce a mixture; and
forming the molecular sieve blend from the mixture into a shaped body selected from beads, pellets, tablets and extrudates.

20. A process for the drying of a cracked, hydrocarbon gas stream comprising
passing the cracked hydrocarbon gas stream over or through a molecular sieve blend produced by a process comprising
preparing or obtaining a hydrophilic zeolite product;
preparing or obtaining a hydrophobic silica binder comprising a colloidal silica;
mixing the zeolite with the silica binder and calcining at about 600° C. to produce a mixture; and
forming the molecular sieve water blend from the mixture into a shaped body selected from beads, pellets, tablets and extrudates.

* * * * *